United States Patent
Kumagai et al.

(10) Patent No.: US 6,763,707 B2
(45) Date of Patent: Jul. 20, 2004

(54) FAILURE DETERMINATION SYSTEM AND METHOD FOR INTERNAL COMBUSTION ENGINE AND ENGINE CONTROL UNIT

(75) Inventors: Katsuhiro Kumagai, Saitama-ken (JP); Shinichi Kitajima, Saitama-ken (JP); Futoshi Nishioka, Saitama-ken (JP); Toshinari Shinohara, Saitama-ken (JP); Kan Nakaune, Saitama-ken (JP); Atsushi Matsubara, Saitama-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 14 days.

(21) Appl. No.: 10/319,176

(22) Filed: Dec. 12, 2002

(65) Prior Publication Data

US 2003/0110845 A1 Jun. 19, 2003

(30) Foreign Application Priority Data

Dec. 12, 2001 (JP) .......................... 2001-378662

(51) Int. Cl.[7] .............. G01L 3/26; G01L 5/13; G01M 15/00
(52) U.S. Cl. ..................................... 73/117.3
(58) Field of Search .................... 123/90.18, 90.15, 123/90.12, 520, 501, 435, 295, 90.11, 90.17, 396; 73/116, 117.3; 60/285

(56) References Cited

U.S. PATENT DOCUMENTS

| | | | | |
|---|---|---|---|---|
| 5,549,080 A | * | 8/1996 | Uchikawa | 123/90.16 |
| 5,626,108 A | * | 5/1997 | Kato et al. | 123/90.15 |
| 6,178,934 B1 | * | 1/2001 | Hirasawa et al. | 123/90.11 |
| 6,330,870 B1 | * | 12/2001 | Inoue et al. | 123/90.17 |
| 6,457,353 B1 | * | 10/2002 | Kanke et al. | 73/117.3 |
| 6,491,022 B2 | * | 12/2002 | Okamoto | 123/396 |
| 6,615,778 B2 | * | 9/2003 | Iwaki et al. | 123/90.17 |
| 6,684,837 B2 | * | 2/2004 | Miyakoshi | 123/90.17 |

* cited by examiner

Primary Examiner—Edward Lefkowitz
Assistant Examiner—Octavia Davis
(74) Attorney, Agent, or Firm—Lahive & Cockfield, LLP; Anthony A. Laurentano

(57) ABSTRACT

A failure determination system and method for an internal combustion engine and an engine control unit are provided which are capable of properly determining a failure of a variable valve mechanism for inactivating a valve system associated with at least one of cylinders during a predetermined operation of the engine, by discriminating a misfire caused by the failure of the mechanism from a normal misfire. Fuel injection valves inject fuel for each cylinder and oxygen concentration of exhaust gases is detected. A misfire condition is detected on a cylinder-by-cylinder basis. Fuel injection to a misfiring cylinder is stopped. A failure of the mechanism is determined, when a parameter based on the oxygen concentration detection indicates a richer value of an actual air-fuel ratio of the exhaust gases than a predetermined reference value does, under a condition of the fuel injection being stopped.

20 Claims, 10 Drawing Sheets

F I G. 1
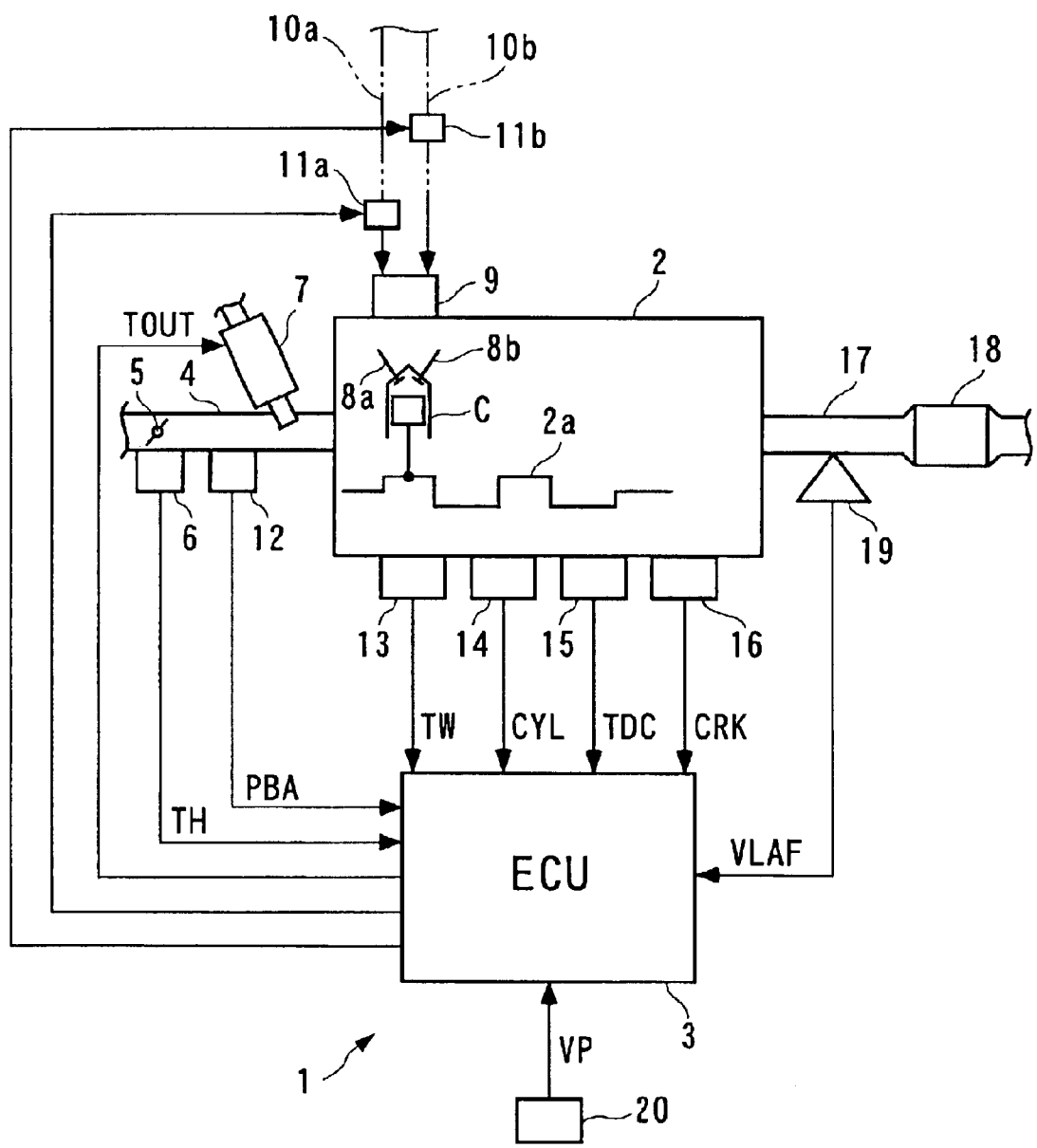

FAILURE DETERMINATION SYSTEM AND METHOD FOR INTERNAL COMBUSTION ENGINE AND ENGINE CONTROL UNIT

BACKGROUND OF THE INVENTION

1. Field of the Invention

This invention relates to a failure determination system and method for an internal combustion engine and an engine control unit, and more particularly to a failure determination system and method and an engine control unit, for determining a failure of a variable valve mechanism which inactivates a valve system associated with at least one of cylinders during a predetermined operation of the engine.

2. Description of the Prior Art

Conventionally, a control system for an internal combustion engine has been disclosed e.g. in the publication of Japanese Patent No. 2507550. The control system is used for controlling the fuel supply and cut-off of the fuel supply depending on a misfire condition of the engine. More specifically, the control system detects a misfire condition, on a cylinder-by-cylinder basis, based on variation in the rotational speed of a crankshaft, and cuts off the supply of fuel to a cylinder in which a misfire has been determined to occur, for a predetermined time period. Further, after that, the supply of fuel to the cylinder is resumed, and it is detected again whether or not a misfire occurs, thereby preventing continuation of the state in which the misfire has been determined to occur and fuel supply is cut off, in spite of the fact that a misfire actually no longer occurs.

However, the conventional control system suffers from the following problems: Internal combustion engines include a type which has a variable valve mechanism for inactivating predetermined ones of cylinders during deceleration of the vehicle. The variable valve mechanism is configured such that it keeps an intake valve and an exhaust valve of each of the predetermined cylinders capable of opening and closing when these cylinders are allowed to operate, and on the other hand, when they are inhibited from operation, it holds the intake and exhaust valves in a state incapable of opening and closing. As a result, in the case of this kind of engine, if a failure of the variable valve mechanism has occurred, the intake and exhaust valves, which should open and close for operation of the cylinders as their inherent function, are sometimes held closed, causing misfires in these cylinders. However, in the conventional control system, since detection of a misfire is carried out only based on variation in the rotational speed of the crankshaft, it is impossible to determine whether the misfire occurs due to a failure of the variable valve mechanism or due to unstable combustion in the misfiring cylinder (normal misfire). This makes it impossible to properly cope with a misfire in a manner suited to the cause of the misfire.

SUMMARY OF THE INVENTION

It is an object of the invention to provide a failure determination system and method for an internal combustion engine and an engine control unit, which are capable of properly determining a failure of a variable valve mechanism by discriminating a misfire caused by the failure of the variable valve mechanism from a normal misfire.

To attain the above object, according to a first aspect of the present invention, there is provided a failure determination system for an internal combustion engine including a variable valve mechanism for inactivating a valve system associated with at least one of cylinders during a predetermined operation of the engine.

The failure determination system according to the first aspect of the invention is characterized by comprising:

cylinder-discriminating means for discriminating a particular one of the cylinders;

fuel injection valves for injecting fuel for the cylinders, on a cylinder-by-cylinder basis;

oxygen concentration-detecting means for detecting concentration of oxygen contained in exhaust gases exhausted from the engine;

misfire-detecting means for detecting a misfire condition of the engine, on a cylinder-by-cylinder basis;

fuel injection-stopping means for stopping fuel injection from the fuel injection valves to a cylinder of which occurrence of a misfire is detected by the misfire-detecting means; and failure-determining means for determining that a failure of the variable valve mechanism has occurred, when an oxygen concentration parameter determined based on results of the detection by the oxygen concentration-detecting means assumes a value which indicates a richer value of an actual air-fuel ratio of the exhaust gases than a predetermined reference value does, under a condition of the stoppage of fuel injection being carried out by the fuel injection-stopping means.

According to this failure determination system, a misfire condition of the engine is detected on a cylinder-by-cylinder basis, and fuel injection to a cylinder of which occurrence of a misfire is detected by the misfire-detecting means via its associated fuel injection valve is stopped. When the oxygen concentration parameter determined based on results of the detection by the oxygen concentration-detecting means assumes a value which indicates a richer value of an actual air-fuel ratio of the exhaust gases than a predetermined reference value does, under the condition of the stoppage of fuel injection being carried out, it is judged that a failure of the variable valve mechanism has occurred. The variable valve mechanism, if normal, keeps the valve systems capable of opening and closing, when the engine is in an operating condition other than the predetermined condition. If the supply of fuel to a misfiring cylinder is cut off to supply only air to the cylinder, the oxygen concentration parameter responsive to oxygen concentration of exhaust gasses should indicate a leaner value of the air-fuel ratio of exhaust gases than when the fuel cut-off is not carried out, provided that the valve system is normally operating. Therefore, inversely, when the oxygen concentration parameter under the same conditions assumes a value indicating a richer value of the air-fuel ratio than a predetermined reference value does, it can be judged that the valve system of the misfiring cylinder is held closed and the variable valve mechanism is in a failure state in which it cannot control the valve system to a state capable of opening and closing. Further, in this case, the failure of the variable valve mechanism can be identified as the cause of the misfire, which makes it possible to clearly distinguish the misfire from a normal misfire.

Preferably, the fuel injection-stopping means cancels the stoppage of the fuel injection when the, oxygen concentration parameter assumes a value which indicates a leaner value of the actual air-fuel ratio of the exhaust gases than the predetermined reference value does.

According to this preferred embodiment, when the oxygen concentration parameter assumes a value which indicates a leaner value of the actual air-fuel ratio of the exhaust gases than the predetermined reference value does, i.e. when a misfire occurs due to some cause other than the failure of the variable valve mechanism, the stoppage of fuel injection is cancelled, whereby the engine can be properly and quickly restored to a state controlled to normal operation.

Preferably, the failure determination system includes engine rotational speed-detecting means for detecting a rotational speed of the engine, and the predetermined reference value is set such that the predetermined reference value indicates a richer value of the actual air-fuel ratio of the exhaust gases as the detected rotational speed of the engine is lower.

Preferably, the oxygen concentration parameter is an average value of a correction coefficient calculated in response to the detected oxygen concentration for use in air-fuel ratio feedback control of the engine.

Preferably, the failure determination system includes inhibition means for inhibiting the stoppage of the fuel injection by the fuel injection-stopping means and the determination by the failure-determining means, when a cylinder of which the occurrence of a misfire is detected does not belong to the at least one of the cylinders.

To attain the above object, according to a second aspect of the present invention, there is provided a failure determination system for an internal combustion engine including a variable valve mechanism for inactivating a valve system associated with at least one of cylinders during a predetermined operation of the engine.

The failure determination system according to the second aspect of the invention is characterized by comprising:
 a cylinder-discriminating module for discriminating a particular one of the cylinders;
 fuel injection valves for injecting fuel for the cylinders, on a cylinder-by-cylinder basis;
 an oxygen concentration-detecting module for detecting concentration of oxygen contained in exhaust gases exhausted from the engine;
 a misfire-detecting module for detecting a misfire condition of the engine, on a cylinder-by-cylinder basis;
 a fuel injection-stopping module for stopping fuel injection from the fuel injection valves to a cylinder of which occurrence of a misfire is detected by the misfire-detecting module; and
 a failure-determining module for determining that a failure of the variable valve mechanism has occurred, when an oxygen concentration parameter determined based on results of the detection by the oxygen concentration-detecting module assumes a value which indicates a richer value of an actual air-fuel ratio of the exhaust gases than a predetermined reference value does, under a condition of the stoppage of fuel injection being carried out by the fuel injection-stopping module.

According to the second aspect of the invention, the same advantageous effects as provided by the first aspect of the invention can be obtained.

Preferably, the fuel injection-stopping module cancels the stoppage of the fuel injection when the oxygen concentration parameter assumes a value which indicates a leaner value of the actual air-fuel ratio of the exhaust gases than the predetermined reference value does.

According to this preferred embodiment, the same advantageous effects as provided by the corresponding preferred embodiment of the first aspect of the invention can be obtained.

Preferably, the failure determination system includes an engine rotational speed-detecting module for detecting a rotational speed of the engine, and the predetermined reference value is set such that the predetermined reference value indicates a richer value of the actual air-fuel ratio of the exhaust gases as the detected rotational speed of the engine is lower.

Preferably, the failure determination system includes an inhibition module for inhibiting the stoppage of the fuel injection by the fuel injection-stopping module and the determination by the failure-determining module, when a cylinder of which the occurrence of a misfire is detected does not belong to the at least one of the cylinders.

To attain the above object, according to a third aspect of the present invention, there is provided a method of determining a failure of a variable valve mechanism of an internal combustion engine, the variable valve mechanism inactivating a valve system associated with at least one of cylinders during a predetermined operation of the engine.

The method according to the third aspect of the invention is characterized by comprising the steps of:
 discriminating a particular one of the cylinders;
 injecting fuel for the cylinders, on a cylinder-by-cylinder basis;
 detecting concentration of oxygen contained in exhaust gases exhausted from the engine;
 detecting a misfire condition of the engine, on a cylinder-by-cylinder basis;
 stopping fuel injection from the fuel injection valves to a cylinder of which occurrence of a misfire is detected; and
 determining that a failure of the variable valve mechanism has occurred, when an oxygen concentration parameter determined based on results of the detection of oxygen concentration assumes a value which indicates a richer value of an actual air-fuel ratio of the exhaust gases than a predetermined reference value does, under a condition of the stoppage of fuel injection being carried out.

According to the third aspect of the invention, the same advantageous effects as provided by the first aspect of the invention can be obtained.

Preferably, the step of stopping fuel injection includes canceling the stoppage of the fuel injection when the oxygen concentration parameter assumes a value which indicates a leaner value of the actual air-fuel ratio of the exhaust gases than the predetermined reference value does.

According to this preferred embodiment, the same advantageous effects as provided by the corresponding preferred embodiment of the first aspect of the invention can be obtained.

Preferably, the method includes the step of detecting a rotational speed of the engine, and the step of setting the predetermined reference value such that the predetermined reference value indicates a richer value of the actual air-fuel ratio of the exhaust gases as the detected rotational speed of the engine is lower.

Preferably, the method includes the step of inhibiting the stoppage of the fuel injection and the determination of failure of the variable valve mechanism, when a cylinder of which the occurrence of a misfire is detected does not belong to the at least one of the cylinders.

To attain the above object, according to a fourth aspect of the present invention, there is provided an engine control unit including a control program for causing a computer to determining a failure of a variable valve mechanism of an internal combustion engine, the variable valve mechanism inactivating a valve system associated with at least one of cylinders during a predetermined operation of the engine.

The engine control unit according to the fourth aspect of the invention is characterized in that the control program causes the computer to discriminate a particular one of the cylinders, inject fuel for the cylinders, on a cylinder-by-cylinder basis, detect concentration of oxygen contained in exhaust gases exhausted from the engine, detect a misfire condition of the engine, on a cylinder-by-cylinder basis, stop fuel injection from the fuel injection valves to a cylinder of which occurrence of a misfire is detected, and determine that a failure of the variable valve mechanism has occurred, when an oxygen concentration parameter determined based on results of the detection of oxygen concentration assumes a value which indicates a richer value of an actual air-fuel ratio of the exhaust gases than a predetermined reference value does, under a condition of the stoppage of fuel injection being carried out.

According to the fourth aspect of the invention, the same advantageous effects as provided by the first aspect of the invention can be obtained.

Preferably, in the case of the control program causing the computer to stop the fuel injection, the control program causes the computer to cancel the stoppage of the fuel injection when the oxygen concentration parameter assumes a value which indicates a leaner value of the actual air-fuel ratio of the exhaust gases than the predetermined reference value does.

According to this preferred embodiment, the same advantageous effects as provided by the corresponding preferred embodiment of the first aspect of the invention can be obtained.

Preferably, the control program causes the computer to detect a rotational speed of the engine, and set the predetermined reference value such that the predetermined reference value indicates a richer value of the actual air-fuel ratio of the exhaust gases as the detected rotational speed of the engine is lower.

Preferably, the control program causes the computer to inhibit the stoppage of the fuel injection and the determination of failure of the variable valve mechanism, when a cylinder of which the occurrence of a misfire is detected does not belong to the at least one of the cylinders.

The above and other objects, features, and advantages of the invention will become more apparent from the following detailed description taken in conjunction with the accompanying drawings.

BRIEF DESCRIPTION OF THE DRAWINGS

FIG. 1 is a block diagram schematically showing the arrangement of a failure determination system according to an embodiment of the invention and an internal combustion engine to which the system is applied;

DETAILED DESCRIPTION OF A PREFERRED EMBODIMENT

Figure 2:
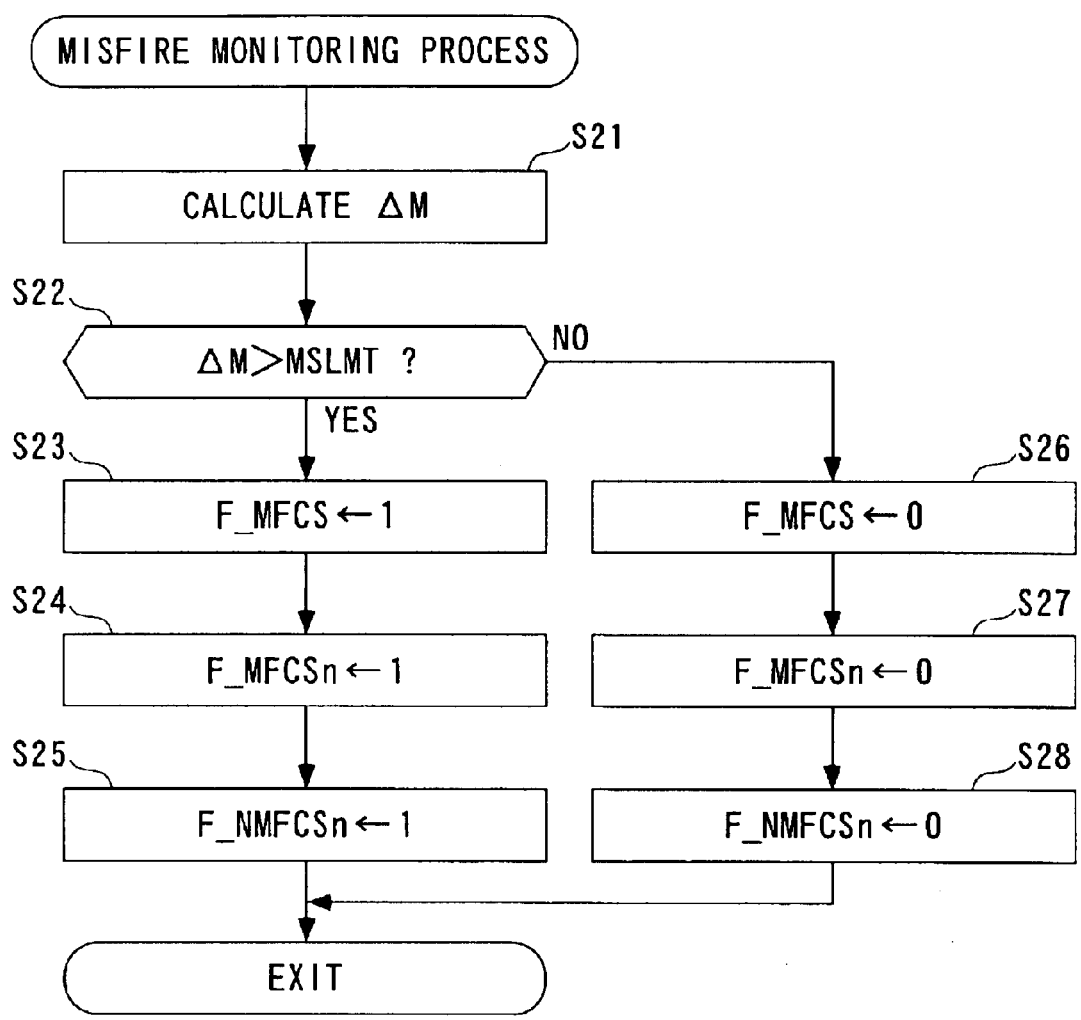
FIG. 2 is a flowchart showing a misfire monitoring process.

The invention will now be described in detail with reference to the drawings showing a preferred embodiment thereof. Referring first to FIG. 1, there is schematically shown the arrangement of an internal combustion engine 2 to which is applied a failure determination system 1 according to an embodiment of the invention.

The internal combustion engine (hereinafter simply referred to as "the engine") 2 is a four-cylinder DOHC gasoline engine including e.g. #1 to #4 cylinders C (only one of which is shown in FIG. 1), installed on a vehicle, not shown. The engine 2 has an intake pipe 4 having a throttle valve 5 arranged therein. A degree of opening of the throttle valve 5 (hereinafter referred to as "the throttle valve opening") TH is sensed by a throttle valve opening sensor 6, and a signal indicative of the sensed throttle valve opening TH is supplied to an ECU 3, referred to hereinafter. The intake pipe 4 has fuel injection valves (hereinafter referred to as "injectors", only one of which is shown) 7 inserted therein for respective cylinders C, at a location downstream of the throttle valve 5. Each injector 7 is connected to a fuel pump, not shown, and the fuel injection period (valve opening period) TOUT of the injector 7 is controlled by a drive signal delivered from the ECU 3.

Further, the engine 2 includes a variable valve mechanism 9 for performing a cylinder-inactivated operation in which predetermined ones of the cylinders are made inactive, i.e. operations thereof are stopped, during deceleration of the vehicle. The variable valve mechanism 9 is connected to a hydraulic pump, not shown, via oil passages 10a, 10b. In respective intermediate portions of the oil passages 10a, 10b, an electromagnetic valve 11a and an electromagnetic valve 11b are arranged for intake valves 8a and exhaust valves 8b (valve system) of the #2 to #4 cylinders C. The electromagnetic valves 11a, 11b are both of a normally-closed type and open the oil passages 10a, 10b when they are turned on by drive signals delivered from the ECU 3, respectively.

To carry out the cylinder-inactivated operation both of the electromagnetic valves 11a, 11b are turned on to open the oil passages 10a, 10b, whereby oil pressure is supplied from the hydraulic pump to the variable valve mechanism 9. As a result, the intake valve 8a and an intake cam, not shown, as well as the exhaust valve 8b and an exhaust cam, not shown, are disconnected from each other in each of the #2 to #4 cylinders C, whereby the intake valve 8a and the exhaust valve 8b are held closed to make the #2 to #4 cylinders C inactive, while the #1 cylinder C is normally operated. Further, during the cylinder-inactivated operation, fuel injection from each injector 8 to each of the #2 to #4 cylinders C is stopped under the control of the ECU 3.

On the other hand, to carry out an all-cylinder operation, both of the electromagnetic valves 11a, 11b are turned off to close the oil passages 10a, 10b, whereby the supply of oil pressure from the hydraulic pump to the variable valve mechanism 9 is stopped. Thus, the disconnection of the intake valve 8a and the intake cam and that of the exhaust valve 8b and the exhaust cam are cancelled in each of the #2 to #4 cylinders C to thereby enable the intake valve 8a and the exhaust valve 8b to open and close. This causes the #2 to #4 cylinders C to operate together with the #1 cylinder C. It should be noted that this variable valve mechanism 9 is a well-known one comprising a rocker arm, a synchronized piston, and a spring, none of which is shown.

An intake pipe absolute pressure sensor 12 is inserted into the intake pipe 4 at a location downstream of the throttle valve 5. The intake pipe absolute pressure sensor 12 is formed of a semiconductor pressure sensor or the like, and detects an absolute pressure in the intake pipe 4 as an intake pipe absolute pressure PBA to deliver a signal indicative of the detected intake pipe absolute pressure PBA to the ECU 3. Further, an engine coolant temperature sensor 13 formed of a thermistor or the like is mounted in the cylinder block of the engine 2. The engine coolant temperature sensor 13 detects an engine coolant temperature TW which is a temperature of an engine coolant circulating through the cylinder block of the engine 2 to deliver a signal indicative of the detected engine coolant temperature TW to the ECU 3.

On the other hand, around a crankshaft 2a of the engine 2, there are arranged a cylinder discriminating sensor 14 (cylinder-discriminating means), a TDC sensor 15, and a crank angle sensor 16 (misfire-detecting means), all of which are connected to the ECU 3. These sensors 14 to 16 are each comprised of a magnet rotor, not shown, and an MRE (magnetic resistance element) pickup, not shown, and generate pulse signals at predetermined crank angle positions, respectively. More specifically, the cylinder discriminating sensor 14 generates a pulse of a cylinder discriminating signal CYL (hereinafter referred to as "the CYL signal") at a predetermined crank angle position of a particular cylinder. The TDC sensor 15 generates a pulse of a TDC signal at a predetermined crank angle position of each cylinder slightly before a TDC (top dead center) position at the start of an intake stroke of the piston in the cylinder. In the present embodiment in which the engine 2 is of a four-cylinder type, the TDC signal is delivered whenever the crankshaft rotates through 180 degrees. Further, the crank angle sensor 16 generates a crank angle position signal (hereinafter referred to as the "CRK signal") at a shorter cycle than that of the TDC signal i.e. whenever the crankshaft rotates through e.g. 30 degrees.

The ECU 3 determines the respective crank angle positions of the cylinders C, on a cylinder-by-cylinder basis, based on these CYL, TDC, and CRK signals, and calculates a rotational speed (hereinafter referred to as "the engine rotational speed") NE based on the CRK signal.

The engine 2 has an exhaust pipe 17 having a three-way catalyst 18 arranged therein for reducing emissions of exhaust gases, such as HC, CO, and NOx. Further, a LAF sensor 19 (oxygen concentration-detecting means) is arranged in the exhaust pipe 17 at a location upstream of the three-way catalyst 18. The LAF sensor 19 linearly detects the concentration of oxygen in exhaust gases in a broad air-fuel ratio range from a rich region to a lean region, to deliver a signal indicative of the detected concentration VLAF of oxygen to the ECU 3. Also input to the ECU 3 is a signal indicative of a travelling speed of the vehicle (vehicle speed) VP from a vehicle speed sensor 20.

In the present embodiment, the ECU 3 forms the misfire-detecting means, fuel injection-stopping means, and failure-determining means, and is implemented by a microcomputer comprised of a CPU, a RAM, a ROM, and an input/output interface, none of which is shown. The CPU determines operating conditions of the engine 2 based on engine parameter signals received from the above sensors, according to control programs stored in the ROM, and data stored in the RAM. Then, the CPU calculates a fuel injection time period TOUT by using the following equation (1) to deliver a drive signal based on the result of the calculation to each injector 7.

$$TOUT = TIMAP \times KAF \times K1 + K2 \quad (1)$$

In the above equation (1), TIMAP represents a basic fuel injection time period determined by searching a map, not shown, according to the engine rotational speed NE and the intake pipe absolute pressure PBA. KAF represents an air-fuel ratio feedback correction coefficient (hereinafter referred to as "the air-fuel ratio F/B coefficient") set in response to the oxygen concentration VLAF sensed by the LAF sensor 19. More specifically, in order to control the air-fuel ratio of a mixture supplied to the engine 2 to a stoichiometric air-fuel ratio, the air-fuel ratio F/B coefficient KAF is feedback-controlled to a value smaller than 1.0 when the oxygen concentration VLAF assumes a value indicating a value of the air-fuel ratio richer than the stoichiometric air-fuel ratio, whereas when the oxygen concentration VLAF assumes a value indicating a value of the air-fuel ratio leaner than the stoichiometric air-fuel ratio, the air-fuel ratio F/B coefficient KAF is feedback-controlled to a value larger than 1.0. Further, K1 and K2 designate a correction coefficient other than the air-fuel ratio F/B coefficient, and a correction term, which are set according to the operating conditions of the engine 2, respectively.

The CPU carries out the cylinder-inactivated operation of the engine 2 by operating the variable valve mechanism 9 during deceleration of the vehicle. Further, the CPU detects a misfire condition of the engine 2. When it is judged that a misfire occurs in the engine 2, the CPU determines whether or not a failure of the variable valve mechanism 9 has occurred. FIGS. 2 to 9 show a sequence of processes for carrying out the misfire determination and the failure determination. These processes are carried out in synchronism with generation of each pulse of the TDC signal. It should be noted that in the following description, fixed data items stored in the ROM each have a symbol "#" attached to a head thereof for discrimination from non-fixed data which are updated as occasion arises.

A misfire monitoring process shown in FIG. 2 is carried out for determining whether or not a misfire has occurred in the engine 2, on a cylinder-by-cylinder basis, based on variation in the rotational speed of the crankshaft 2a of the engine 2. First, in a step 21 (in the figure, shown as "S21", which rule applies similarly to the other steps in the following description), a rotational variation amount ΔM of the crankshaft 2a is calculated. The rotational variation amount ΔM is calculated as the difference between the present value Mn and the immediately preceding value Mn−1 of an average value M of time intervals of occurrence of pulses of the CRK signal delivered from the crank angle sensor 16.

Next, it is determined in a step 22 whether or not the rotational variation amount ΔM is larger than a predetermined value MSLMT. The predetermined value MSLMT is read out from a map, not shown, set in advance, according to the engine rotational speed NE and the intake pipe absolute pressure PBA. If the answer to the question of the step 22 is affirmative (YES), i.e. if ΔM>MSLMT holds, it is judged, since the rotational variation amount of the crankshaft 2a is large, that a misfire has occurred in a cylinder C ignited by the present ignition, and in a step 23, a misfire occurrence flag F_MFCS representing an occurrence of the misfire is set to 1. Then, respective corresponding ones (associated with the cylinder ignited by the present ignition)

of first and second cylinder-by-cylinder misfire occurrence flags F_MFCSn and F_MFCSn (n=1 to 4) representing an occurrence of the misfire on a cylinder-by-cylinder basis are set to 1 in steps 24 and 25, respectively, followed by terminating the program.

On the other hand, if the answer to the question of the step 22 is negative (NO), i.e. if $\Delta M \leq MSLMT$ holds, it is judged that no misfire has occurred in the cylinder C ignited by the present ignition, and the misfire occurrence flag F_MFCS is set to 0 in a step 26. Then, the respective corresponding ones of the first and second cylinder-by-cylinder misfire occurrence flags F_MFCSn and F_MFCSn are set to 0, in steps 27 and 28, respectively, followed by terminating the program.

Figure 3:
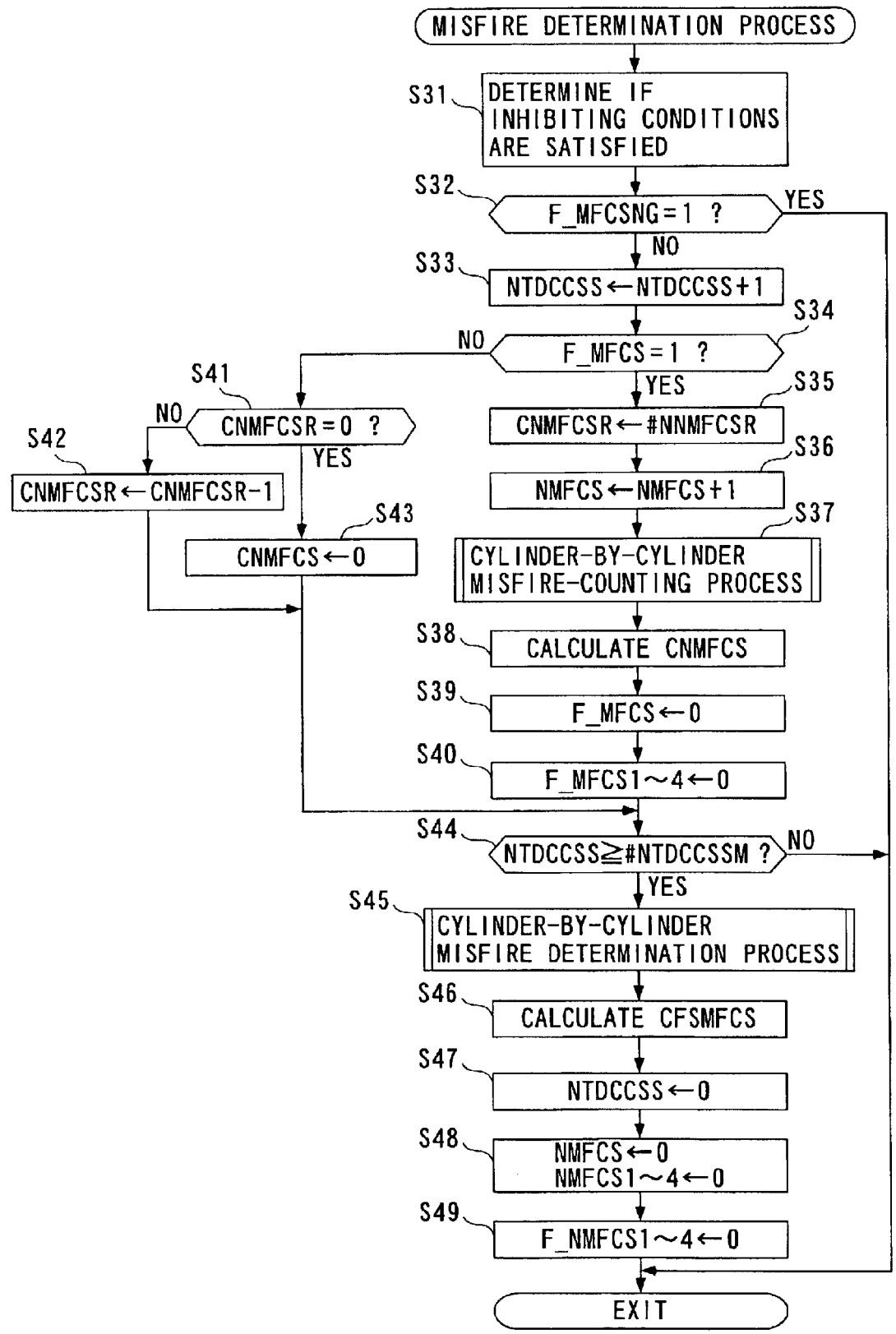
FIG. 3 is a flowchart showing a misfire determination process.

A misfire determination process shown in FIG. 3 is carried out for determining whether or not a misfire occurs, on a cylinder-by-cylinder basis, by monitoring a condition of occurrence of a misfire (misfire condition) for a predetermined time period through the misfire monitoring process which is executed, as described above, whenever a pulse of the TDC signal is generated. First, in a step 31, it is determined whether or not conditions for inhibiting misfire determination are satisfied. This determination is carried out by a subroutine, not shown. In this subroutine, e.g. if the engine 2 is in its steady operating condition, and at the same time the engine coolant temperature TW, the engine rotational speed NE, the intake pipe absolute pressure PBA, and the vehicle speed VP are within respective predetermined ranges, misfire determination is permitted to set a misfire determination-inhibiting flag F_MFCSNG to 0, whereas if not, misfire determination is inhibited to set the misfire determination-inhibiting flag F_MFCSNG to 1.

Next, it is determined in a step 32 whether or not the misfire determination-inhibiting flag F_MFCSNG assumes 1. If the answer to this question is affirmative (YES), i.e. if misfire determination is inhibited, the program is immediately terminated, whereas if the answer to this question is negative (NO), i.e. if misfire determination is permitted, a determination process execution counter NTDCCSS indicative of the number of times of execution of the misfire determination process is incremented in a step 33. Then, it is determined in a step 34 whether or not the misfire occurrence flag F_MFCS assumes 1. If the answer to this question is affirmative (YES), i.e. if a misfire has occurred in the present ignition, a no-misfire counter CNMFCSR is set to a predetermined value #NNMFCSR (e.g. 4) in a step 35, and a misfire occurrence counter NMFCS is incremented in a step 36.

Figure 4:
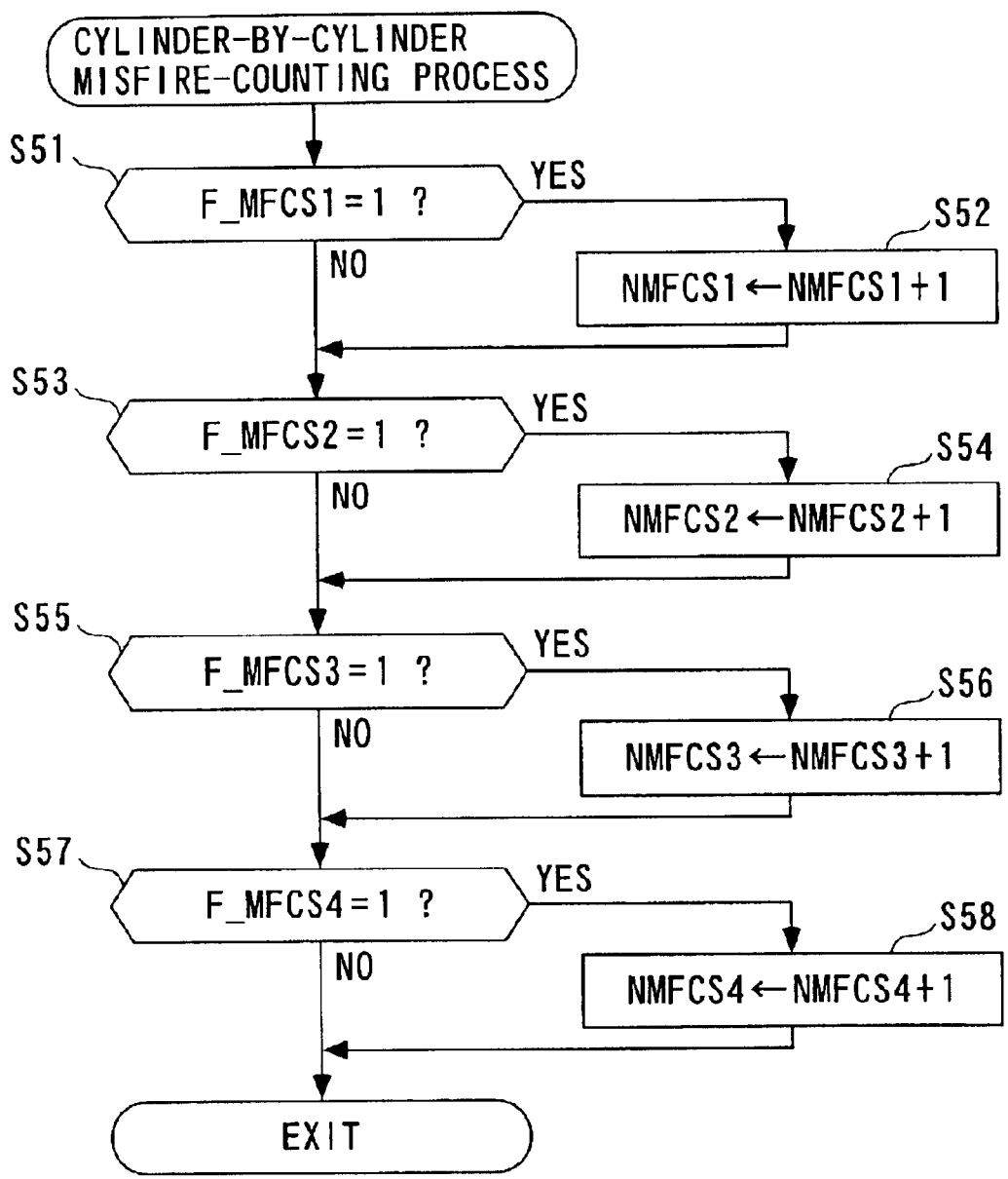
FIG. 4 is a flowchart showing a subroutine for carrying out a cylinder-by-cylinder misfire-counting process executed in a step 37 in FIG. 3.

Then, a cylinder-by-cylinder misfire-counting process is executed in a step 37. FIG. 4 shows a subroutine for carrying out this process. More specifically, first, it is determined in a step 51 whether or not the first cylinder-by-cylinder misfire occurrence flag F_MFCS1 for the #1 cylinder C assumes 1. If the answer to this question is affirmative (YES), i.e. if a misfire has occurred in the #1 cylinder C, a cylinder-by-cylinder misfire occurrence counter NMFCS1 for the #1 cylinder C is incremented in a step 52. Similarly, in the following, it is determined in respective steps 53, 55, and 57 whether or not the first cylinder-by-cylinder misfire occurrence flags F_MFCS 2 to F_MFCS4 for the respective #2 to #4 cylinders C assume 1. If any of the answers to these questions are affirmative (YES), a corresponding one (or corresponding ones) of cylinder-by-cylinder misfire occurrence counters NMFCS 2 to NMFCS4 are incremented in a corresponding one (or corresponding ones) of steps 54, 56, and 58, followed by terminating the program. That is, the values of the cylinder-by-cylinder misfire occurrence counters NMFCS1 to NMFCS4 represent the numbers of times of occurrence of a misfire in the #1 to #4 cylinders C, respectively.

Referring again to FIG. 3, in a step 38 following the step 37, the number of misfiring cylinders (misfiring cylinder number) CNMFCS is calculated based on the second cylinder-by-cylinder misfire occurrence flags F_NMFCS1 to F_NMFCS4 set in the FIG. 2 misfire monitoring process by the following equation (2):

$$CNMFCS = \Sigma F\_NMFCSn(n=1 \text{ to } 4) \qquad (2)$$

As is apparent from this equation (2), the misfiring cylinder number CNMFCS represents the number of cylinders out of the #1 to #4 cylinders C which have misfired during the immediately preceding cycle of ignitions including the present ignition.

Then, the misfire occurrence flag F_MFCS is reset to 0 in a step 39, and the first cylinder-by-cylinder misfire occurrence flags F_MFCS1 to F_MFCS4 are reset to 0 in a step 40, followed by the program proceeding to a step 44, referred to hereinafter.

On the other hand, if the answer to the question of the step 34 is negative (NO), i.e. if the misfire occurrence flag F_MFCS=0 holds, which means that a misfire has not occurred in the present ignition, it is determined in a step 41 whether or not the value of the no-misfire counter CNMFCSR set in the step 35 assumes 0. If the answer to this question is negative (NO), the no-misfire counter CNMFCSR is decremented in a step 42, followed by the program proceeding to the step 44. On the other hand, if the answer to the question of the step 41 is affirmative (YES), which means that CNMFCSR=0, that is, if non-occurrence of a misfire has been continuously detected the number of times corresponding to the predetermined value #NNMFCSR, the misfiring cylinder number CNMFCS is reset to 0 in a step 43, followed by the program proceeding to the step 44.

In the step 44 following the step 40, 42 or 43, it is determined whether or not the value of the determination process execution counter NTDCCSS is equal to or larger than a predetermined value #NTDCCSSM (e.g. 400). If the answer to this question is negative (NO), which means that NTDCCSS<#NTDCCSSM holds, that is, if the number of times of execution of the present misfire determination process has not reached the predetermined value #NTDCCSSM, the program is immediately terminated.

Figure 5:
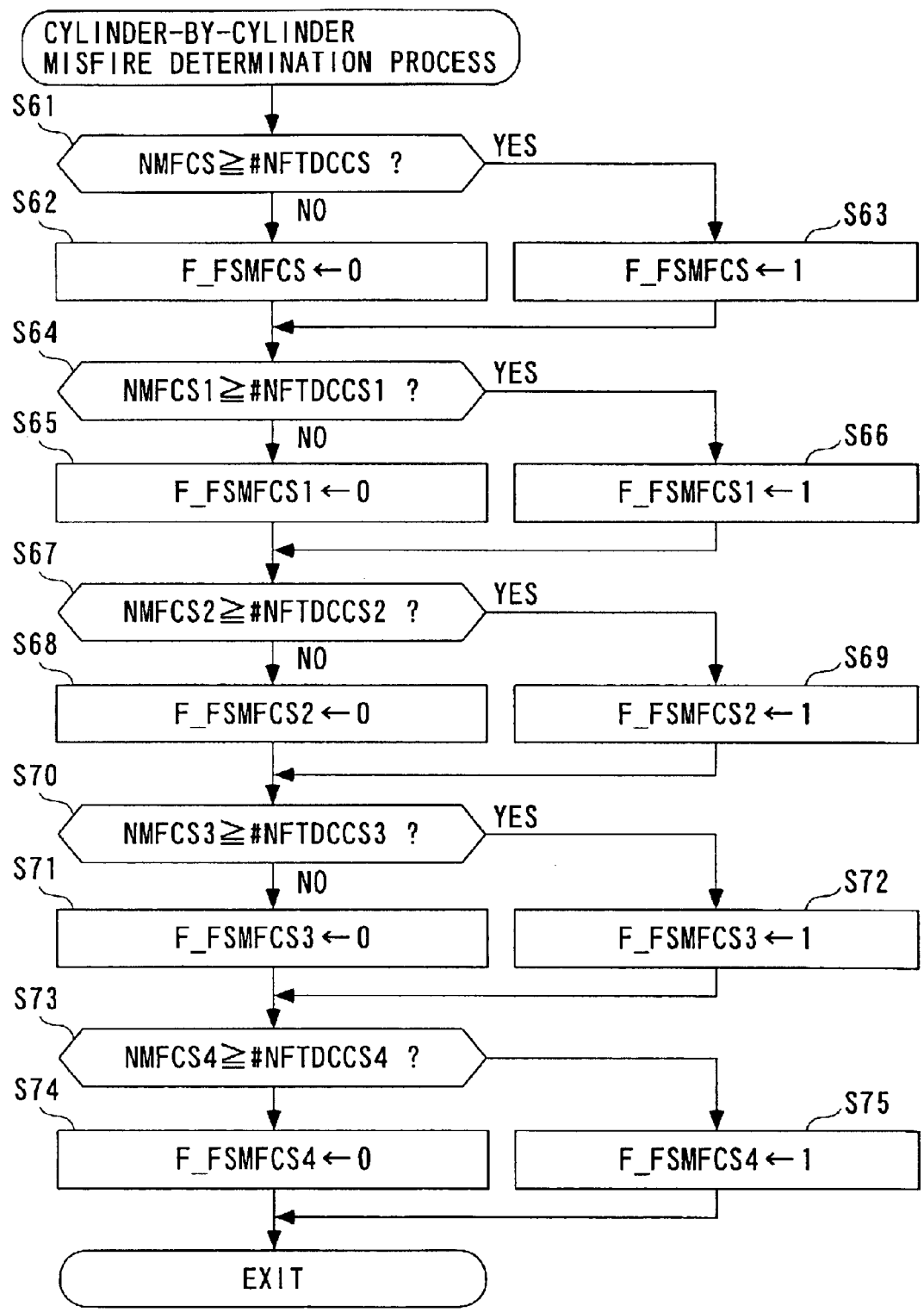
FIG. 5 is a flowchart showing a subroutine for carrying out a cylinder-by-cylinder misfire determination process executed in a step 45 in FIG. 3.

On the other hand, if the answer to the question of the step 44 is affirmative (YES), i.e. if the number of times of execution of the present misfire determination process has reached the predetermined value #NTDCCSSM, a cylinder-by-cylinder misfire determination process is carried out in a step 45. FIG. 5 shows a subroutine for carrying out this process. More specifically, first, it is determined in a step 61 whether or not the value of the misfire occurrence counter NMFCS counted in the step 36 is equal to or larger than a predetermined value #NFTDCCS (e.g. 300). If the answer to the question of the step 61 is negative (NO), i.e. if NMFCS<#NFTDCCS, it is judged that the number of misfires having occurred in the whole engine 2 is small, and a misfire occurrence-determining flag F_FSMFCS is set to 0 in a step 62. On the other hand, if the answer to the question of the step 61 is affirmative (YES), i.e. if NMFCS≧#NFTDCCS holds, it is judged that the number of misfires having occurred in the whole engine 2 is large, and the misfire occurrence-determining flag F_FSMFCS is set to 1 in a step 63.

Then, it is determined in a step 64 whether or not the value of the cylinder-by-cylinder misfire occurrence counter NMFCS1 for the #1 cylinder C counted in the step 52 in FIG. 4 is equal to or larger than a predetermined value #NFTDCCS1 (e.g. 50). If the answer to this question is negative (NO), i.e. if NMFCS1<#NFTDCCS1 holds, it is judged, since the number of misfires having occurred in the #1 cylinder C is small, that a misfire does not occur in the #1 cylinder C, and in a step 65, a cylinder-by-cylinder misfire occurrence-determining flag F_FSMFCS1 is set to 0. On the other hand, if the answer to the question of the step 64 is affirmative (YES), i.e. if NMFCS1≧#NFTDCCS1 holds, it is judged, since the number of misfires having occurred in the #1 cylinder C is large, that a misfire occurs in the #1 cylinder C, and in a step 66, the cylinder-by-cylinder misfire occurrence-determining flag F_FSMFCS1 is set to 1.

Similarly, in the following, it is determined in respective steps 67, 70, and 73 whether or not the values of the cylinder-by-cylinder misfire occurrence counter NMFCS 2 to NMFCS4 for the respective #2 to #4 cylinders C are equal to or smaller than predetermined values #NFTDCCS2 to #NFTDCCS4 (e.g. 50, respectively). Depending on respective answers to these questions, if an answer to a corresponding one of the questions is negative (NO), a corresponding one of the cylinder-by-cylinder misfire occurrence-determining flags F_FSMFCS2 to F_FSMFCS4 is set to 0 in a corresponding one of steps 68, 71, and 74, whereas if the answer is affirmative (YES), the corresponding one of the cylinder-by-cylinder misfire occurrence-determining flags F_FSMFCS2 to F_FSMFCS4 is set to 1 in a corresponding one of steps 69, 72, and 75, followed by terminating the program.

Referring again to FIG. 3, in a step 46 following the step 45, a misfire-determined cylinder number CFSMFCS is calculated based on the above cylinder-by-cylinder misfire occurrence-determining flags F_FSMFCS1 to F_FSMFCS4 by the following equation (3):

$$CFSMFCS = \Sigma F\_FSMFCSn(n=1 \text{ to } 4) \qquad (3)$$

As is apparent from this equation (3), the misfire-determined cylinder number CFSMFCS represents the number of cylinders out of the #1 to #4 cylinders C of which occurrence of a misfire is determined by the cylinder-by-cylinder misfire determination process.

Then, the determination process execution counter NTDCCSS is reset to 0 in a step 47. Further, the misfire occurrence counter NMFCS and the cylinder-by-cylinder misfire occurrence counters NMFCS1 to NMFCS4 are reset to 0 in a step 48, and the second cylinder-by-cylinder misfire occurrence flags F_MFCS1 to F_MFCS4 are reset to 0 in a step 49, followed by terminating the program.

Figure 6:
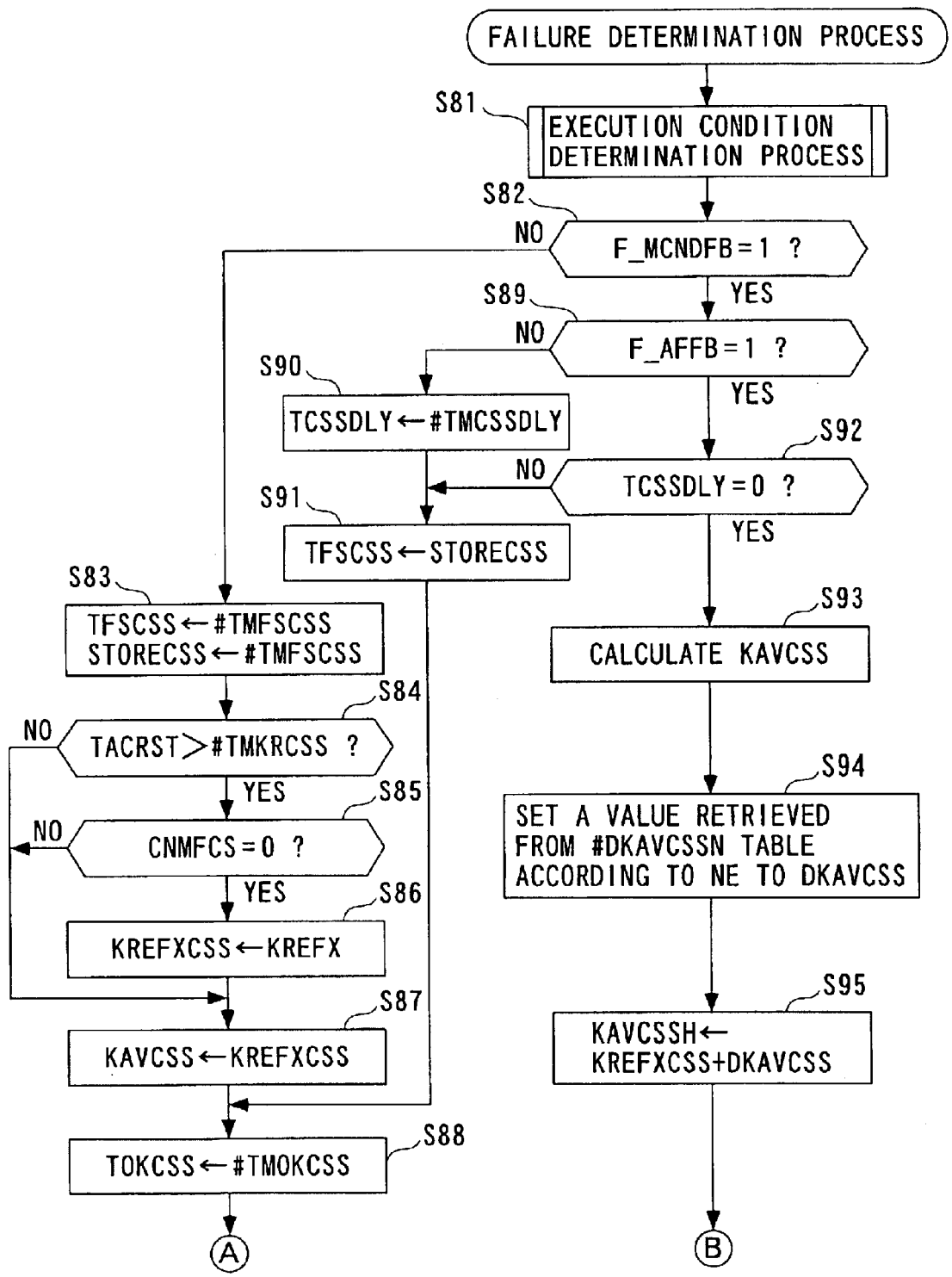
FIG. 6 is a flowchart showing a main routine for carrying out a failure determination process.
Figure 7:
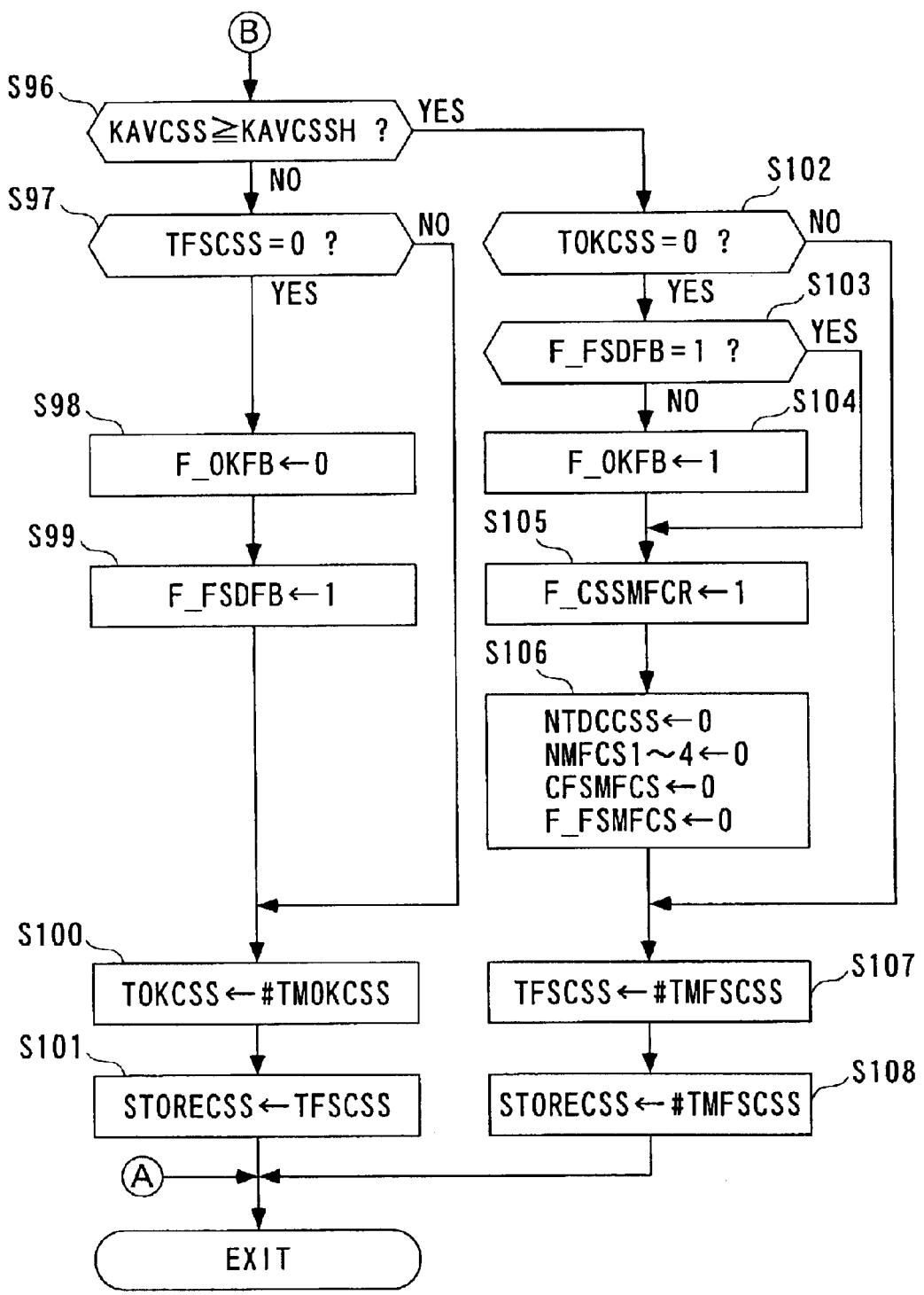
FIG. 7 is a continuation of the FIG. 6 flowchart.
Figure 8:
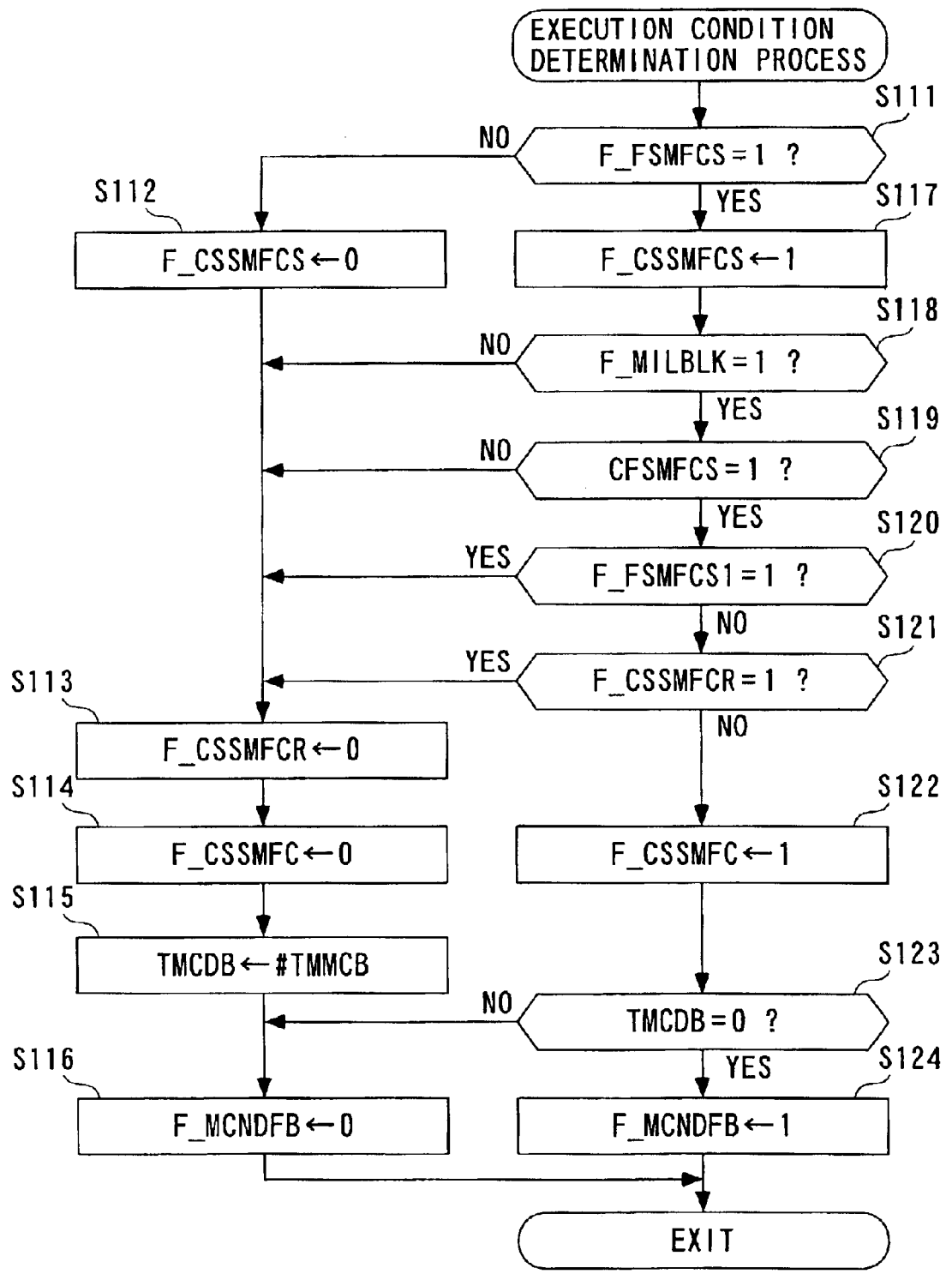
FIG. 8 is a flowchart showing a subroutine for carrying out an execution condition determination process for performing failure determination, which is executed in a step 81 in FIG. 6.

FIG. 6 shows a main routine for carrying out a failure determination process for determining whether or not a failure of the variable valve mechanism 9 has occurred. In this process, first, an execution condition determination process is carried out in a step 81, which is carried out for determining whether or not conditions for executing determination of a failure of the variable valve mechanism 9 are satisfied. The execution condition determination process is executed according to a subroutine shown in FIG. 8. More specifically, it is determined in a step 111 whether or not the misfire occurrence-determining flag F_FSMFCS set in the step 62 or 63 in FIG. 5 assumes 1. If the answer to this question is negative (NO), i.e. if the number of misfires having occurred in the whole engine 2 is small, it is judged that the conditions for executing the failure determination are not satisfied, and a control-stopping request flag F_CSSMFCS, an F/C (fuel cut-off) cancellation request flag F_CSSMFCR, and an F/C request flag F_CSSMFC, all of which are referred to hereinafter, are set to 0, in steps 112 to 114, respectively. Further, a delay timer TMCDB is set to a predetermined time period #TMMCB (e.g. 2 seconds) in a step 115, and a failure determination-permitting flag F_MCNDFB is set to 0 in a step 116, followed by terminating the program.

On the other hand, if the answer to the question of the step 111 is affirmative (YES), i.e. if the number of misfires having occurred in the whole engine 2 is large, the control-stopping request flag F_CSSMFCS is set to 1 in a step 117. Although not shown, if the control-stopping request flag F_CSSMFCS assumes 1, EGR control for recirculating part of exhaust gasses to the intake pipe 4, lean-burn control for performing combustion by an air-fuel mixture leaner than the stoichiometric air-fuel ratio, and purge control for purging evaporative fuel to the intake pipe 4 are stopped. Next, it is determined in a step 118 whether or not a misfire-warning flag F_MILBLK assumes 1. The misfire-warning flag F_MILBLK is set to 1 to warn occurrence of a misfire by blinking of a warning lamp, not shown. If the answer to the question of the step 118 is negative (NO), i.e. if the warning lamp is not warning occurrence of a misfire, the program proceeds to the step 113 et seq.

If the answer to the question of the step 118 is affirmative (YES), it is determined in a step 119 whether or not the misfire-determined cylinder number CFSMFCS calculated by the above equation (3) is equal to 1. If the answer to this question is negative (NO), i.e. if the number of cylinders of which occurrence of a misfire is determined is equal to or larger than 2, it is judged that the conditions for executing the failure determination are not satisfied, and the program proceeds to the step 113 et seq., whereas if the answer to the question of the step 119 is affirmative (YES), i.e. if it is judged that a misfire occurs in only one cylinder C, it is determined in a step 120 whether or not the cylinder-by-cylinder misfire occurrence-determining flag F_FSMFCS1 assumes 1. If the answer to this question is affirmative (YES), i.e. if the misfiring cylinder is the #1 cylinder C, it is determined that the failure determination should not be carried out, followed by the program proceeding to the step 113 et seq. This is because the #1 cylinder C is not driven by the variable valve mechanism 9, as described hereinabove, and the misfire has no relation to the failure of the variable valve mechanism 9.

If the answer to the question of the step 120 is negative (NO), i.e. if a misfire occurs in any one of the #2 to #4 cylinders C, it is determined in a step 121 whether or not the F/C cancellation request flag F_CSSMFCR assumes 1. As described hereinafter, the F/C cancellation request flag F_CSSMFCR is set to 1 to cancel the F/C condition when by executing the failure determination under the F/C condition of the engine 2, it is determined that a misfire does not occur. Therefore, if the answer to the question of the step 121 is affirmative (YES), i.e. if F_CSSMFCR=1 holds, it is judged that the failure determination should not be carried out, and the program proceeds to the step 113 et seq.

On the other hand, if the answer to the question of the step 121 is negative (NO), it is judged that the conditions for executing the failure determination are satisfied, and to carry out the failure determination, the F/C request flag F_CSSMFC is set to 1 in a step 122.

Figure 9:
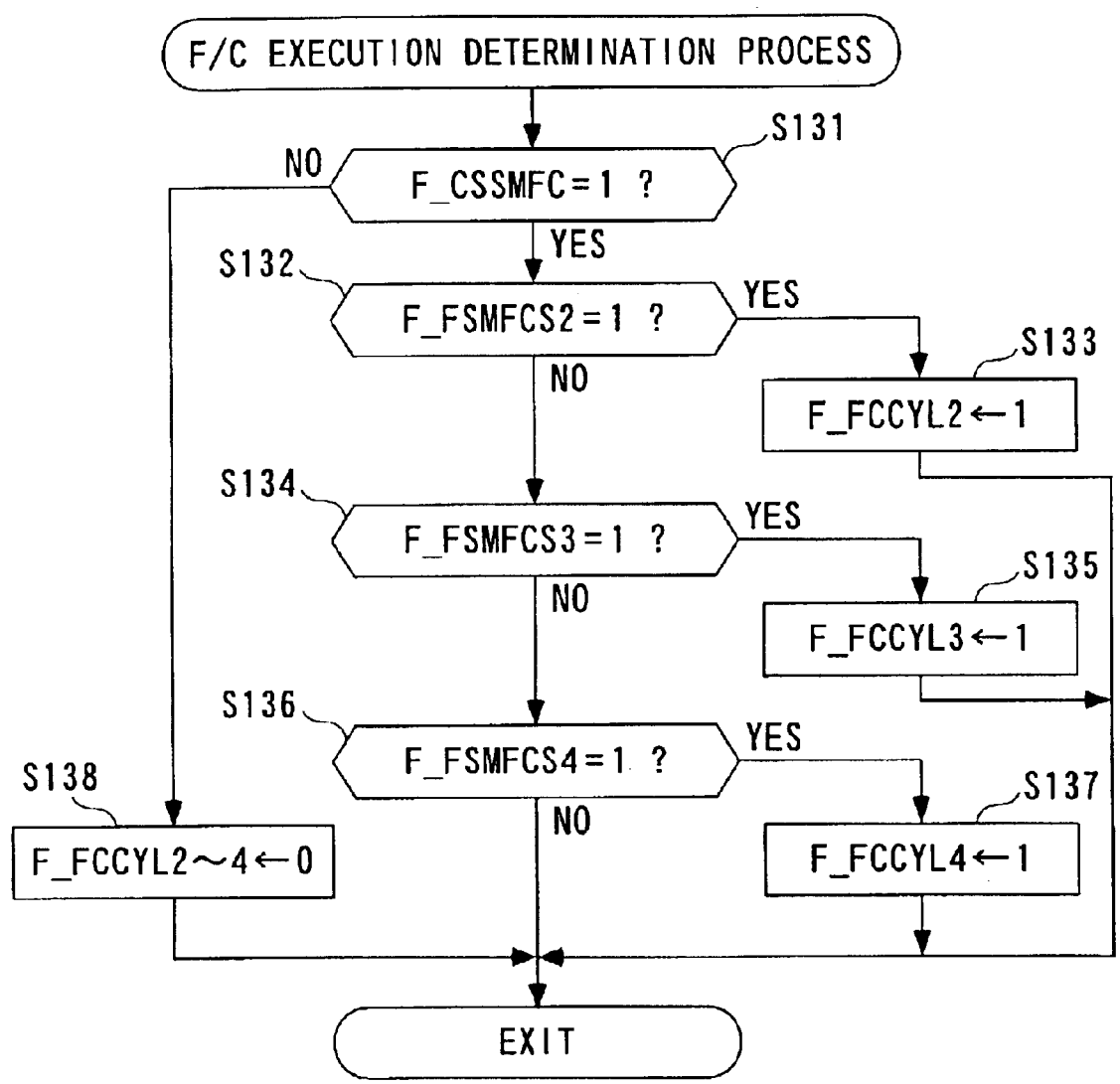
FIG. 9 is a flowchart showing a routine for carrying out an F/C execution determination process.

FIG. 9 shows an F/C execution determination process carried out depending on the set value of the F/C request flag F_CSSMFC. In this process, it is determined in a step 131 whether or not the F/C request flag F_CSSMFC assumes 1. If the answer to this question is affirmative (YES), i.e. if an F/C request has been made, it is determined in a step 132 whether or not the cylinder-by-cylinder misfire occurrence-determining flag F_FSMFCS2 for the #2 cylinder C assumes 1. If the answer to this question is affirmative (YES), i.e. if it is determined that the #2 cylinder C misfires, an F/C-instruction flag F_FCCYL2 for the #2 cylinder C is set to 1 in a step 133. This causes fuel injection from the injector 7 of the #2 cylinder C to be stopped to thereby carry out fuel cut-off of the #2 cylinder C.

Similarly, in the following, it is determined in respective steps 134 and 136 whether or not the cylinder-by-cylinder misfire occurrence-determining flags F_FSMFCS3 and F_FSMFCS4 for the cylinders C #3 and #4 assume 1. If an answer to a corresponding one of these questions is affirmative (YES), a corresponding one of F/C-instruction flags F_FCCYL3 and F_FCCYL4 is set to 1 in a corresponding one of steps 135 and 137, whereby fuel cut-off of the #3 or #4 cylinder C in which a misfire occurs is carried out. Further, if the answer to the question of the above step 131 is negative (NO), i.e. if no F/C request has been made, the F/C-instruction flags F_FCCYL2 to F_FCCYL4 for the #2 to #4 cylinders C are set to 0, in a step 138, thereby inhibiting fuel cut-off of all the cylinders C, followed by terminating the program.

Referring again to FIG. 8, in a step 123 following the step 122, it is determined whether or not the value of the delay timer TMCDB set in the step 115 is equal to 0. If the answer to this question is negative (NO), the program proceeds to the step 116 to hold the failure determination-permitting flag F_MCNDFB at 0. On the other hand, if the answer to the question of the step 123 is affirmative (YES), i.e. if the predetermined time period #TMMCB has elapsed after starting to execute the fuel cut-off, in order to permit execution of the failure determination, the failure determination-permitting flag F_MCNDFB is set to 1 in a step 124, followed by terminating the execution condition determination process.

Referring again to the failure determination process in FIG. 6, in a step 82 following the step 81, it is determined whether or not the failure determination-permitting flag F_MCNDFB set in the execution condition determination process assumes 1. If the answer to this question is negative (NO), i.e. if the conditions for executing the failure determination are not satisfied, a failure determination timer TFSCSS and a hold timer STORECSS are each set to a predetermined time period #TMFSCSS (e.g. 20 seconds), in a step 83. Then, it is determined in a step 84 whether or not the value of a post-start timer TACRST is larger than a value corresponding to a predetermined time period #TMKRCSS (e.g. 60 seconds). Further, it is determined in a step 85 whether or not the misfiring cylinder number CNMFCS calculated by the equation (2) is equal to 0.

If either of the answers to the questions of the steps 84 and 85 is negative (NO), i.e. if the predetermined time period #TMKRCSS has not yet elapsed after the start of the engine 2, or if at least one of the #1 to #4 cylinders C has misfired during the immediately preceding cycle of ignitions including the present ignition, the initial value of an average value KAVCSS, referred to hereinafter, of the air-fuel ratio F/B coefficient KAF is set to a reference value KREFXCSS (in this case, corresponding to the stoichiometric air-fuel ratio) in a step 87. Then, a normal misfire-determining timer TOKCSS is set to a predetermined time period #TMOKCSS (e.g. 20 seconds) in a step 88, followed by terminating the program. On the other hand, if both of the answers to the questions of the steps 84 and 85 are affirmative (YES), a learned reference value KREFX of the air-fuel ratio F/B coefficient KAF is set to the reference value KREFXCSS in a step 86, followed by the program proceeding to the step 87.

On the other hand, if the answer to the question of the step 82 is affirmative (YES), i.e. if the conditions for executing the failure determination are satisfied, it is determined in a step 89 whether or not an air-fuel ratio F/B control flag F_AFFB assumes 1. If the answer to this question is negative (NO), i.e. if the feedback control of the air-fuel ratio F/B coefficient KAF responsive to the oxygen concentration VLAF detected by the LAF sensor 19 is not being executed, a delay timer TCSSDLY is set to a predetermined time period #TMCSSDLY (e.g. 2 seconds) in a step 90, and the failure determination timer TFSCSS is set to the present value of the hold timer STORECSS in a step 91, followed by the program proceeding to the step 88.

If the answer to the question of the step 89 is affirmative (YES), i.e. if the feedback control of the air-fuel ratio F/B coefficient KAF is being executed, it is determined in a step 92 whether or not the value of the delay timer TCSSDLY is equal to 0. If the answer to this question is negative (NO), the program proceeds to the step 91, whereas if the answer to this question is affirmative (YES), i.e. if the predetermined time period #TMCSSDLY has elapsed after the feedback control of the air-fuel ratio F/B coefficient KAF has been resumed, the average value KAVCSS of the air-fuel ratio F/B coefficient KAF is calculated in a step 93 by the following equation (4):

$$KAVCSS = KAF \times CKAVCSS + KAVCSS(1.0 - CKAVCSS) \quad (4)$$

In the above equation (4), KAVCSS on the right side represents the immediately preceding value, while CKAVCSS represents an averaging coefficient (e.g. 0.2) smaller than the value 1.0. It should be noted that the averaging coefficient CKAVCSS may be set to a different value depending on whether or not the engine 2 is idling. In this case, a smaller value (e.g. 0.1) may be set for use during idling of the engine 2.

Figure 10:
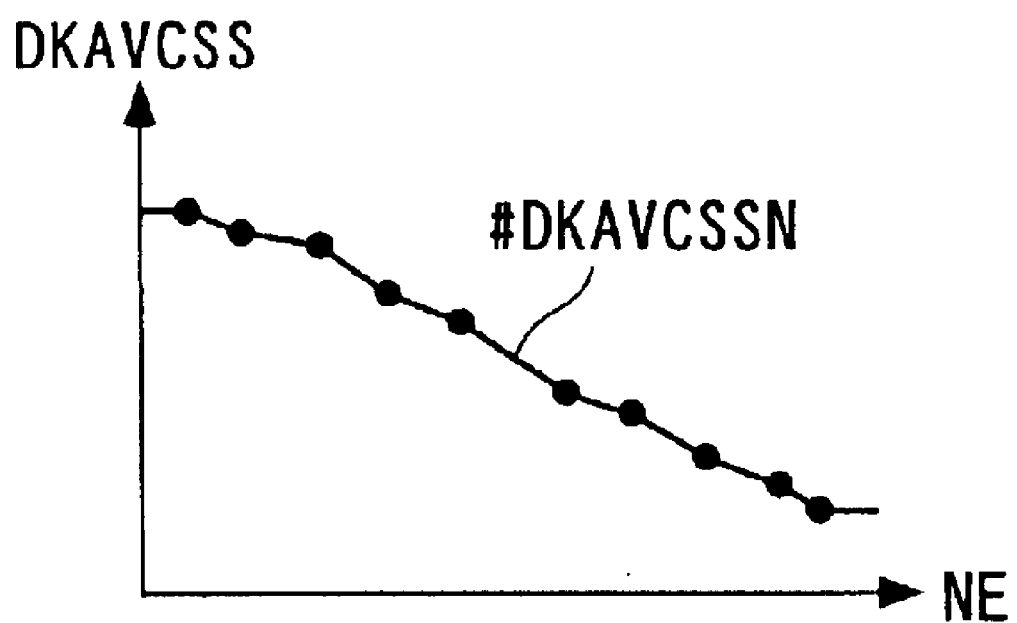
FIG. 10 is a diagram showing an example of a #DKAVC-SSN table for use in determining an addend value DKAVCSS for use in carrying out the failure determination.

Then, a table value #DKAVCSSN is calculated according to the engine rotational speed NE, by retrieval from a table shown in FIG. 10, and set to an addend value (reference value increment) DKAVCSS for the failure determination, in a step 94. In this table, the table value #DKAVCSSN is set to a larger value as the engine rotational speed NE is smaller, for a reason described hereinafter.

Next, a value obtained by adding the addend value DKAVCSS set in the step 94 to the reference value KREFXCSS set in the step 86 is set to a reference value KAVCSSH for use in the failure determination, in a step 95. After that, it is determined in a step 96 whether or not the average value KAVCSS calculated by the equation (4) is equal to or larger than the reference value KAVCSSH. If the answer to this question is negative (NO), i.e. if the average value KAVCSS<the reference value KAVCSSH holds, it is determined in a step 97 whether or not the value of the failure determination timer TFSCSS is equal to 0.

If the answer to this question is negative (NO), the program proceeds to a step 100, referred to hereinafter, whereas if the answer to this question is affirmative (YES), i.e. if the state of KAVCSS<KAVCSSH has continued for the predetermined time period #TMFSCSS, it is judged that a failure of the variable valve mechanism 9 has occurred, and that the misfire in the present case is not a normal misfire but one caused by the failure of the variable valve mechanism 9, and a normal misfire determination flag F_OKFB is set to 0 to indicate the fact in a step 98, and a failure determination flag F_FSDFB is set to 1 in a step 99.

In the step 100 following the step 97 or 99, similarly to the step 88, the normal misfire-determining timer TOKCSS is set to the predetermined time period #TMOKCSS, and then the hold timer STORECSS is set to the present value of the failure determination timer TFSCSS in a step 101, followed by terminating the program.

As described hereinabove, according to the present embodiment, first, a misfiring one of the #1 to #4 cylinders C is identified based on variation in the rotational speed of the crankshaft 2a of the engine 2, by carrying out the misfire determination process described above with reference to FIG. 3. Then, fuel cut-off is executed on the misfiring cylinder, and when the average value KAVCSS of the air-fuel ratio F/B coefficient KAF obtained by carrying out the air-fuel ratio feedback control during execution of the fuel cut-off is smaller than the reference value KAVCSSH, it is determined that failure of the variable valve mechanism 9 has occurred. The variable valve mechanism 9, if normal, keeps the intake valve 8a and the exhaust valve 8b capable of opening and closing, during the all-cylinder operation. If fuel cut-off is carried out on the misfiring cylinder C to supply only air to the cylinder C, the air-fuel ratio F/B coefficient KAF should be controlled to a value (larger value) indicating (directed to) a richer value of the air-fuel ratio of the exhaust gases in response to a value of the oxygen concentration VLAF indicating a leaner value of the air-fuel ratio of the exhaust gases. Therefore, inversely, when the average value KAVCSS of the air-fuel ratio F/B coefficient KAF is smaller than the reference value KAVCSSH, it is possible to properly judge that the intake and exhaust valves 8a and 8b of the misfiring cylinder are held closed, and the variable valve mechanism 9 is in a failure state thereof in which it cannot control the intake valve 8a and exhaust valve 8b of the misfiring cylinder C to the state capable of opening and closing. Further, in this case, the failure of the variable valve mechanism 9 can be identified as the cause of the present misfiring condition, which makes it possible to clearly distinguish such a misfire from a normal misfire.

Further, the degree of change in the oxygen concentration VLAF during the fuel cut-off tends to be increased as the engine rotational speed NE is lower. Hence, the addend value DKAVCSS applied to the reference value KAVCSSH is set according to the engine rotational speed NE, as described above, whereby the reference value KAVCSSH can be appropriately set. This makes it possible to determine a failure of the variable valve mechanism 9 more appropriately.

If the answer to the question of the step 96 is affirmative (YES), i.e. if the average value KAVCSS≧the reference value KAVCSSH holds, it is determined in a step 102 whether or not the value of the normal misfire-determining timer TOKCSS is equal to 0. If the answer to this question is negative (NO), the program proceeds to a step 107, referred to hereinafter, whereas if the answer to this question is affirmative (YES), i.e. if the state of KAVCSS≧KAVCSSH has continued for the predetermined time period #TMOKCSS, it is determined in a step 103 whether or not the failure determination flag F_FSDFB assumes 1. If the answer to this question is negative (NO), i.e. if it is not determined that a failure of the variable valve mechanism 9 has occurred, it is judged that the misfire is not caused by a failure of the variable valve mechanism 9, and that the present misfire is a normal one which occurs due to some cause other than the failure of the variable valve system 9, and to indicate the fact, the normal misfire determination flag F_OKFB is set to 1 in a step 104, followed by the program proceeding to a step 105, referred to hereinafter. On the other hand, if the answer to the question of the step 103 is affirmative (YES), i.e. if the failure determination flag F_FSDFB=1 holds, the program skips over the step 104 to thereby suspend determination that the present misfire is a normal one. By carrying out the above control processes, it is possible to clearly discriminate between a misfire caused by a failure of the variable valve mechanism 9 and a normal misfire occurring due to some cause other than the failure of the variable valve mechanism 9.

In the step 105 following the step 103 or 104, the F/C cancellation request flag F_CSSMFCR is set to 1, whereby if it is not determined that a failure of the variable valve mechanism 9 has occurred, the fuel cut-off is cancelled to resume fuel supply to the misfiring cylinder after termination of the failure determination. This makes it possible to restore the engine 2 to its normal operating condition suitably and quickly.

Then, in a step 106, the determination process execution counter NTDCCSS, the cylinder-by-cylinder misfire occurrence counters NMFCS1 to NMFCS4, the misfire-determined cylinder number CFSMFCS, and the misfire occurrence-determining flag F_FSMFCS are each reset to 0. Further, similarly to the step 83, the failure determination timer TFSCSS and the hold timer STORECSS are set to the predetermined time period #TMFSCSS (e.g. 20 seconds), in respective steps 107 and 108, followed by terminating the program.

As described hereinabove, according to the present embodiment, a misfire condition of the engine 2 is detected on a cylinder-by-cylinder basis, and fuel cut-off is carried out on a misfiring cylinder, whereby it is judged that a failure of the variable valve mechanism 9 has occurred when the average value KAVCSS of the air-fuel ratio F/B coefficient KAF obtained by carrying out feedback control during execution of the fuel cut-off is smaller than the reference value KAVCSSH. Therefore, in this case, it is possible to properly judge that the intake and exhaust valves 8a and 8b are held closed and the variable valve mechanism 9 is in a failure state thereof in which it cannot control the intake valve 8a and exhaust valve 8b of the misfiring cylinder C to the state capable of opening and closing. Further, in this case, the failure of the variable valve mechanism 9 can be identified as the cause of the misfire, which makes it possible to clearly distinguish the misfire from a normal misfire.

The present invention is not limited to the embodiment described above by way of example, but can be carried out in various forms. For instance, although in the above embodiment, a misfire in the engine 2 is detected based on variation in the rotational speed of the engine 2, it goes without saying that the detection may be carried out by another suitable means and method. For instance, pressure in each cylinder may be monitored to detect a misfire based on variation in the pressure. Further, although in the above embodiment, the air-fuel ratio F/B coefficient KAF, which is feedback-controlled in response to the oxygen concentration VLAF detected by the LAF sensor 19, is used as a parameter indicative of the concentration of oxygen, the oxygen concentration VLAF may be directly employed in place of the air-fuel ratio F/B coefficient KAF.

It is further understood by those skilled in the art that the foregoing is a preferred embodiment of the invention, and that various changes and modifications may be made without departing from the spirit and scope thereof.

What is claimed is:

1. A failure determination system for an internal combustion engine including a variable valve mechanism for inactivating a valve system associated with at least one of cylinders during a predetermined operation of the engine, the failure determination system comprising:
- cylinder-discriminating means for discriminating a particular one of the cylinders;
- fuel injection valves for injecting fuel for the cylinders, on a cylinder-by-cylinder basis;
- oxygen concentration-detecting means for detecting concentration of oxygen contained in exhaust gases exhausted from the engine;
- misfire-detecting means for detecting a misfire condition of the engine, on a cylinder-by-cylinder basis;
- fuel injection-stopping means for stopping fuel injection from said fuel injection valves to a cylinder of which occurrence of a misfire is detected by said misfire-detecting means; and
- failure-determining means for determining that a failure of the variable valve mechanism has occurred, when an oxygen concentration parameter determined based on results of the detection by said oxygen concentration-detecting means assumes a value which indicates a richer value of an actual air-fuel ratio of the exhaust gases than a predetermined reference value does, under a condition of the stoppage of fuel injection being carried out by said fuel injection-stopping means.

2. A failure determination system according to claim 1, wherein said fuel injection-stopping means cancels the stoppage of the fuel injection when the oxygen concentration parameter assumes a value which indicates a leaner value of the actual air-fuel ratio of the exhaust gases than the predetermined reference value does.

3. A failure determination system according to claim 1, including engine rotational speed-detecting means for detecting a rotational speed of the engine, and
wherein the predetermined reference value is set such that the predetermined reference value indicates a richer value of the actual air-fuel ratio of the exhaust gases as the detected rotational speed of the engine is lower.

4. A failure determination system according to claim 1, wherein the oxygen concentration parameter is an average value of a correction coefficient calculated in response to the detected oxygen concentration for use in air-fuel ratio feedback control of the engine.

5. A failure determination system according to claim 1, including inhibition means for inhibiting the stoppage of the fuel injection by said fuel injection-stopping means and the determination by said failure-determining means, when a cylinder of which the occurrence of a misfire is detected does not belong to the at least one of the cylinders.

6. A failure determination system for an internal combustion engine including a variable valve mechanism for inactivating a valve system associated with at least one of cylinders during a predetermined operation of the engine, the failure determination system comprising:
- a cylinder-discriminating module for discriminating a particular one of the cylinders;
- fuel injection valves for injecting fuel for the cylinders, on a cylinder-by-cylinder basis;
- an oxygen concentration-detecting module for detecting concentration of oxygen contained in exhaust gases exhausted from the engine;
- a misfire-detecting module for detecting a misfire condition of the engine, on a cylinder-by-cylinder basis;
- a fuel injection-stopping module for stopping fuel injection from said fuel injection valves to a cylinder of which occurrence of a misfire is detected by said misfire-detecting module; and
- a failure-determining module for determining that a failure of the variable valve mechanism has occurred, when an oxygen concentration parameter determined based on results of the detection by said oxygen concentration-detecting module assumes a value which indicates a richer value of an actual air-fuel ratio of the exhaust gases than a predetermined reference value does, under a condition of the stoppage of fuel injection being carried out by said fuel injection-stopping module.

7. A failure determination system according to claim 6, wherein said fuel injection-stopping module cancels the stoppage of the fuel injection when the oxygen concentration parameter assumes a value which indicates a leaner value of the actual air-fuel ratio of the exhaust gases than the predetermined reference value does.

8. A failure determination system according to claim 6, including an engine rotational speed-detecting module for detecting a rotational speed of the engine, and
wherein the predetermined reference value is set such that the predetermined reference value indicates a richer value of the actual air-fuel ratio of the exhaust gases as the detected rotational speed of the engine is lower.

9. A failure determination system according to claim 6, wherein the oxygen concentration parameter is an average value of a correction coefficient calculated in response to the detected oxygen concentration for use in air-fuel ratio feedback control of the engine.

10. A failure determination system according to claim 6, including an inhibition module for inhibiting the stoppage of the fuel injection by said fuel injection-stopping module and the determination by said failure-determining module, when a cylinder of which the occurrence of a misfire is detected does not belong to the at least one of the cylinders.

11. A method of determining a failure of a variable valve mechanism of an internal combustion engine, the variable valve mechanism inactivating a valve system associated with at least one of cylinders during a predetermined operation of the engine,
the method comprising the steps of:
- discriminating a particular one of the cylinders;
- injecting fuel for the cylinders, on a cylinder-by-cylinder basis;
- detecting concentration of oxygen contained in exhaust gases exhausted from the engine;
- detecting a misfire condition of the engine, on a cylinder-by-cylinder basis;
- stopping fuel injection from said fuel injection valves to a cylinder of which occurrence of a misfire is detected; and
- determining that a failure of the variable valve mechanism has occurred, when an oxygen concentration parameter determined based on results of the detection of oxygen concentration assumes a value which indicates a richer value of an actual air-fuel ratio of the exhaust gases than a predetermined reference value does, under a condition of the stoppage of fuel injection being carried out.

12. A method according to claim 11, wherein the step of stopping fuel injection includes canceling the stoppage of the fuel injection when the oxygen concentration parameter assumes a value which indicates a leaner value of the actual air-fuel ratio of the exhaust gases than the predetermined reference value does.

13. A method according to claim 11, including the step of detecting a rotational speed of the engine, and the step of setting the predetermined reference value such that the predetermined reference value indicates a richer value of the actual air-fuel ratio of the exhaust gases as the detected rotational speed of the engine is lower.

14. A method according to claim 11, wherein the oxygen concentration parameter is an average value of a correction coefficient calculated in response to the detected oxygen concentration for use in air-fuel ratio feedback control of the engine.

15. A method according to claim 11, including the step of inhibiting the stoppage of the fuel injection and the determination of failure of the variable valve mechanism, when a cylinder of which the occurrence of a misfire is detected does not belong to the at least one of the cylinders.

16. An engine control unit including a control program for causing a computer to determining a failure of a variable valve mechanism of an internal combustion engine, the variable valve mechanism inactivating a valve system associated with at least one of cylinders during a predetermined operation of the engine, wherein the control program causes the computer to discriminate a particular one of the cylinders, inject fuel for the cylinders, on a cylinder-by-cylinder basis, detect concentration of oxygen contained in exhaust gases exhausted from the engine, detect a misfire condition of the engine, on a cylinder-by-cylinder basis, stop fuel injection from said fuel injection valves to a cylinder of which occurrence of a misfire is detected, and determine that a failure of the variable valve mechanism has occurred, when an oxygen concentration parameter determined based on results of the detection of oxygen concentration assumes a value which indicates a richer value of an actual air-fuel ratio of the exhaust gases than a predetermined reference value does, under a condition of the stoppage of fuel injection being carried out.

17. An engine control unit according to claim 16, wherein in the case of the control program causing the computer to stop the fuel injection, the control program causes the computer to cancel the stoppage of the fuel injection when the oxygen concentration parameter assumes a value which indicates a leaner value of the actual air-fuel ratio of the exhaust gases than the predetermined reference value does.

18. An engine control unit according to claim 16, wherein the control program causes the computer to detect a rotational speed of the engine, and set the predetermined reference value such that the predetermined reference value indicates a richer value of the actual air-fuel ratio of the exhaust gases as the detected rotational speed of the engine is lower.

19. An engine control unit according to claim 16, wherein the oxygen concentration parameter is an average value of a correction coefficient calculated in response to the detected oxygen concentration for use in air-fuel ratio feedback control of the engine.

20. An engine control unit according to claim 16, wherein the control program causes the computer to inhibit the stoppage of the fuel injection and the determination of failure of the variable valve mechanism, when a cylinder of which the occurrence of a misfire is detected does not belong to the at least one of the cylinders.

* * * * *